United States Patent
Kobayashi

(10) Patent No.: US 7,631,333 B2
(45) Date of Patent: Dec. 8, 2009

(54) DIGITAL BROADCAST RECEIVING APPARATUS

(75) Inventor: Takeshi Kobayashi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 309 days.

(21) Appl. No.: 11/482,769

(22) Filed: Jul. 10, 2006

(65) Prior Publication Data
US 2007/0010327 A1 Jan. 11, 2007

(30) Foreign Application Priority Data
Jul. 11, 2005 (JP) ............................. 2005-201729

(51) Int. Cl.
*G06F 3/00* (2006.01)
*G06F 13/00* (2006.01)
*H04N 5/445* (2006.01)
*H04N 7/16* (2006.01)

(52) U.S. Cl. .................. 725/50; 725/43; 725/40; 725/58; 725/136

(58) Field of Classification Search ............ 725/50, 725/43, 40, 38, 136
See application file for complete search history.

(56) References Cited

U.S. PATENT DOCUMENTS

| | | | | |
|---|---|---|---|---|
| 5,986,650 A * | 11/1999 | Ellis et al. | ............ | 725/40 |
| 6,405,372 B1 * | 6/2002 | Kim et al. | ............ | 725/50 |
| 2002/0100048 A1 * | 7/2002 | Yang et al. | ............ | 725/47 |
| 2002/0194599 A1 * | 12/2002 | Mountain | ............ | 725/39 |
| 2006/0059512 A1 * | 3/2006 | Pugel | ............ | 725/33 |
| 2007/0136749 A1 * | 6/2007 | Hawkins et al. | ............ | 725/38 |

FOREIGN PATENT DOCUMENTS

| | | |
|---|---|---|
| JP | A-2002-271710 | 9/2002 |
| JP | A-2002-314914 | 10/2002 |
| JP | A-2003-9029 | 1/2003 |

* cited by examiner

*Primary Examiner*—Brian T Pendleton
*Assistant Examiner*—Pinkal Chokshi
(74) *Attorney, Agent, or Firm*—Morgan Lewis & Bockius LLP

(57) ABSTRACT

Provided is a digital broadcast receiving apparatus that enables real-time viewing of information about a program of a current channel and a next program to be broadcast, and that can deal with a change in program, if any. In this digital broadcast receiving apparatus, when program information is found in the VBI of a television broadcast signal of a selected channel, the program information is temporarily stored in a memory. When program information display setting is enabled, the program information is read from the memory, and then a program information screen showing the program information including start time, end time, title, and Video-Plus number is displayed in a predetermined area of a display screen. Program information obtained when a predetermined time has elapsed is newly stored in the memory. When it is found that the newly stored program information is different from the program information that has already been stored in the memory, program information to be displayed is updated to the new program information.

5 Claims, 4 Drawing Sheets

DIGITAL BROADCAST RECEIVING APPARATUS

This application is based on Japanese Patent Application No. 2005-201729 filed on Jul. 11, 2005, the contents of which are hereby incorporated by reference.

BACKGROUND OF THE INVENTION

1. Field of the Invention

The present invention relates to a digital broadcast receiving apparatus that has a function of displaying a program information guide for performing selection or programmed recording of broadcast programs such as BS (broadcasting satellite) digital broadcast programs or CS (communication satellite) digital broadcast programs.

2. Description of Related Art

With the recent development of digital technology, broadcasting using a digital signal is made possible in the area of broadcasting, and has already been put into practical use. In conventional analog broadcasting, only one channel can be allocated for one frequency band; in digital broadcasting, the use of MPEG-2 digital compression technology makes it possible to allocate a plurality of channels for one frequency band.

This contributes to an increase in the number of channels in digital broadcasting, making it impossible to obtain a sufficient amount of information from a TV program listing that appeared in printed materials such as newspapers or magazines. It is for this reason that a digital broadcast receiving apparatus has a function of displaying an electronic program guide (EPG), so that the user can easily search or select his/her desired program or perform programmed recording thereof, for example, on the television screen.

The EPG is the ability to receive data such as program information multiplexed with video or audio data transmitted from each broadcast station with a receiving apparatus, and generate a TV program listing based on this received data and then display it on the television screen. In the current digital broadcasting, digital signals such as video data, audio data, clock reference (time information), program specific information (PSI)/service information (SI) are generally multiplexed and then transmitted. The electronic program guide is generated based on the PSI/SI signal.

Incidentally, in a conventional digital broadcast receiving apparatus, the electronic program guide is often displayed on a dedicated screen of a television receiver, or displayed in such a way that the electronic program guide overlays the major part of a currently displayed program image. As a result, the electronic program guide occupies most part of the display screen. This makes it difficult to use the electronic program guide while viewing the program images.

This being the case, a conventional technique disclosed, for example, in JP-A-2002-271710 displays program guide data composed of one or more pieces of program information in part of a display screen so as not to interfere with viewing of program images, thereby making it possible to display an electronic program guide that enables program selection or programmed recording with minimum operation.

However, the electronic program guide (EPG) displayed by the conventional digital broadcast receiving apparatus mentioned earlier cannot respond to a program change in real time, as in the case of a TV program listing that appeared in a newspaper. The problem here is that this makes it impossible to deal with an unexpected program change. On the other hand, the digital broadcast receiving apparatus disclosed in JP-A-2002-271710 can display an electronic program guide by displaying program guide data composed of one or more pieces of program information in part of a display screen so as not to interfere with viewing of program images. Also in this case, however, it is impossible to deal with an unexpected program change.

Another example of a conventional technique disclosed in JP-A-2003-9029 relates to a digital broadcast receiving apparatus and a program information display method, and more particularly relates to program information display in a shared event broadcast program. Thus, this conventional technique does not serve to solve the above-described problems. Moreover, still another example of a conventional technique disclosed in JP-A-2002-314914 is a digital broadcast recording/playback apparatus that facilitates programmed recording of a currently played back program from the next broadcast onward. Thus, this conventional technique also does not serve to solve the above-described problems.

SUMMARY OF THE INVENTION

In view of the conventionally experienced problems described above, it is an object of the present invention to provide a digital broadcast receiving apparatus that enables real-time viewing of information about a program of a current channel and a next program to be broadcast, and that can deal with a change in program, if any.

To achieve the above object, according to the present invention, a digital broadcast receiving apparatus that receives a television broadcast signal multiplexed with video data, audio data, and program information and then transmitted thereto, selects a desired channel, outputs a video signal and an audio signal of the channel, and has a function of displaying an electronic program guide based on the program information is provided with a system control portion. When program information is found in the VBI (vertical blanking interval) of the television broadcast signal and program information display setting is enabled, the system control portion displays a program information screen showing program information including start time, end time, title, and VideoPlus number in a predetermined area of a display screen based on the program information. If a change in the program information is found when a predetermined time has elapsed, the system control portion updates the program information displayed on the program information screen to new program information. If an update of the program information is detected when program information display setting is disabled, the system control portion displays a program information screen showing updated program information on the display screen.

In this structure, when the program information is found in the VBI of the television broadcast signal and program information display setting is enabled, a program information screen showing the program information including start time, end time, title, VideoPlus number is displayed in a predetermined area of the display screen based on the program information. If a change in the program information is found when a predetermined time has elapsed, the program information displayed on the program information screen is updated to new program information. If an update of the program information is detected when program information display setting is disabled, a program information screen showing updated program information is displayed on the display screen.

With this structure, it becomes possible to view information about a program of a current channel and a next program to be broadcast in real time, and deal with a change in program, if any. That is, since the amount of information is small compared to conventional electronic program guides and hence the program information screen can be updated in real time, it is possible to obtain up-to-the-minute program information on a constant basis. Furthermore, since the amount of information is small, the information screen is prevented from occupying large amount of screen space even when the information screen is automatically displayed at the time of program change. This permits the enjoyment of viewing video unobstructed by the information screen.

DETAILED DESCRIPTION OF PREFERRED EMBODIMENTS

Figure 1:
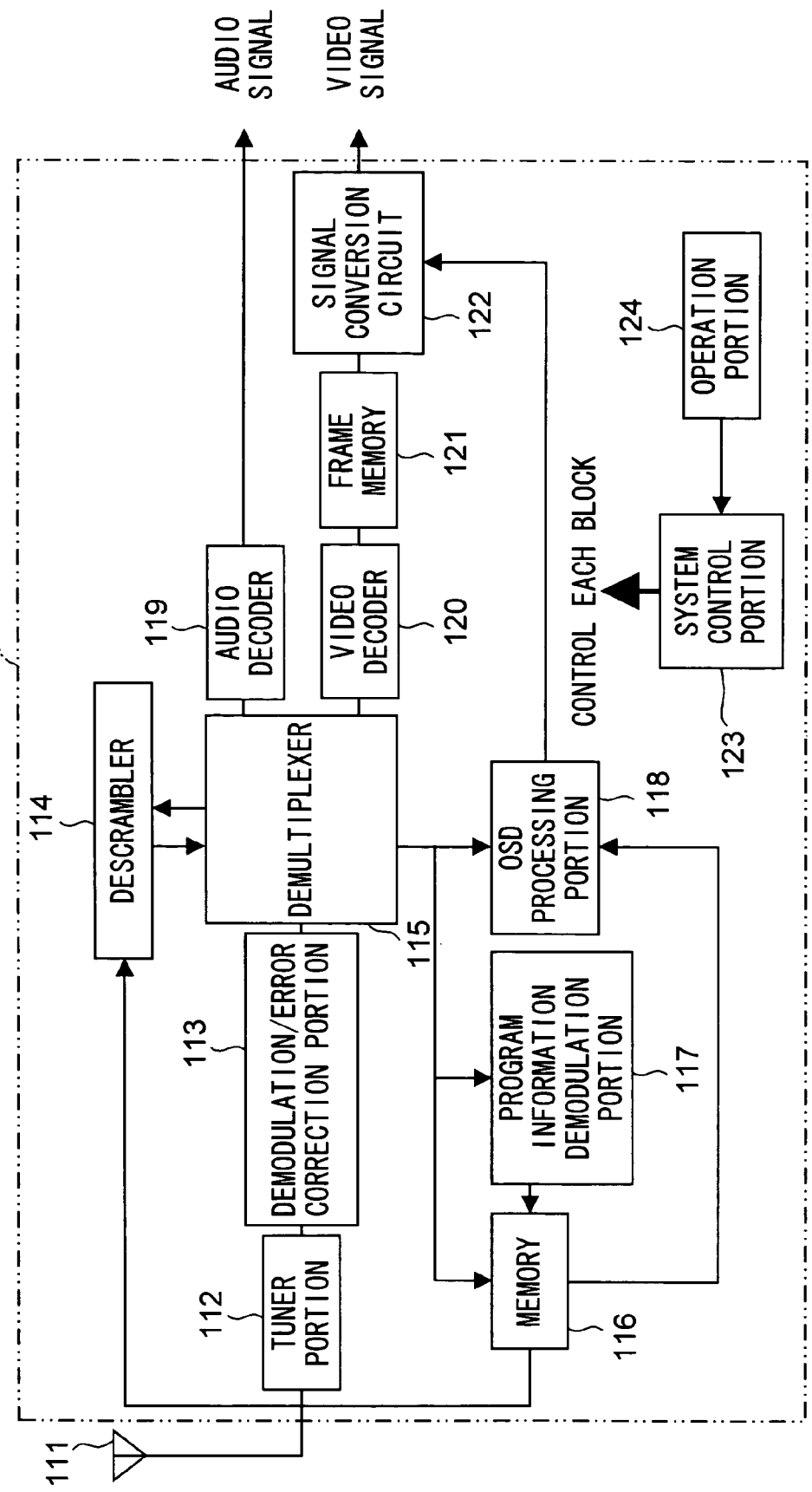
FIG. 1 is a block diagram showing the structure of the digital broadcast receiving apparatus according to one embodiment of the present invention.

Hereinafter, embodiments of the present invention will be described with reference to the accompanying drawings. FIG. 1 is a block diagram showing the structure of the digital broadcast receiving apparatus according to one embodiment of the present invention.

This digital broadcast receiving apparatus (a BS tuner) 100 has an antenna 111, a tuner portion 112, a demodulation/error correction portion 113, a demultiplexer 115, a descrambler 114, and an audio decoder 119. The antenna 111 receives television broadcast waves. The tuner portion 112 selects a broadcast wave of a desired channel from among the received broadcast waves. The demodulation/error correction portion 113 performs demodulation and error correction of video/audio data outputted from the tuner portion 112. The demultiplexer 115 demultiplexes data from a digital broadcast signal into which video data, audio data, and data of program information are multiplexed. The descrambler 114 descrambles a scrambled signal that is added to the demodulated digital broadcast signal for preventing unauthorized viewing. The audio decoder 119 decodes digitally compressed audio data into analog audio signal.

Furthermore, the digital broadcast receiving apparatus 100 has a video decoder 120, a frame memory 121, a signal conversion circuit 122, a program information demodulation portion 117, a memory (or IC card) 116, an OSD (on screen display) processing portion 118, a system control portion 123, and an operation portion 124. The video decoder 120 expands digitally compressed video data and then decodes it into an RGB signal. The frame memory 121 stores one frame of RGB signal outputted from the video decoder 120. The signal conversion circuit 122 down-converts the RGB signal to, for example, a composite video signal. The program information demodulation portion 117 demodulates program information demultiplexed by the demultiplexer 115. The memory 116 records program information, for example. Based on the program information, the OSD processing portion 118 generates electronic program guide data to be displayed on the display screen of the television receiver. The system control portion 123 controls the above-described blocks (components). The operation portion 124 includes an operation panel and a remote control, the operation panel being provided on the front of the main unit for inputting an operation signal to the system control portion 123.

The system control portion 123 includes a program information checking portion, a first program information storage portion, a program information screen display portion, a second program information storage portion, a program information comparison portion, a program information update portion, and a program information update/display portion. The program information checking portion checks whether program information is found in the VBI of the television broadcast signal or not. When the program information is found, the first program information storage portion temporarily stores the program information in the memory 116. When program information display setting is enabled, the program information screen display portion reads the program information from the memory 116, and then displays, in a predetermined area of the display screen, a program information screen showing program information including start time, end time, title, and VideoPlus number. When a predetermined time has elapsed, the second program information storage portion stores new program information in the memory 116. The program information comparison portion compares the program information stored in the memory 116 by the first program information storage portion with the new program information stored in the memory 116 by the second program information storage portion. When the comparison reveals a difference, the program information update portion updates program information to be displayed to the new program information. If the comparison reveals a difference when program information display setting is disabled, the program information update/display portion updates the current program information to new program information, and then displays a program information screen on the display screen.

In the digital broadcast receiving apparatus 100 structured as described above, the system control portion 123 outputs a control signal to the descrambler 114 or the demultiplexer 115 according to an input operation for channel selection from the operation portion 124. Based on the control signal, the descrambler 114 or the demultiplexer 115 extracts a signal of the selected channel. Then, a digitally compressed signal of the selected channel is decoded by the audio decoder 119 and the video decoder 120, and then an audio signal and a video signal of the selected channel are outputted to the television receiver, for example.

With regard to a pay channel that requires subscription, subscription information is read from the memory 116 when the descrambler 114 descrambles a signal of a selected channel. Only when subscription is registered, descrambling is performed successfully, whereby viewing is permitted.

Figure 2:
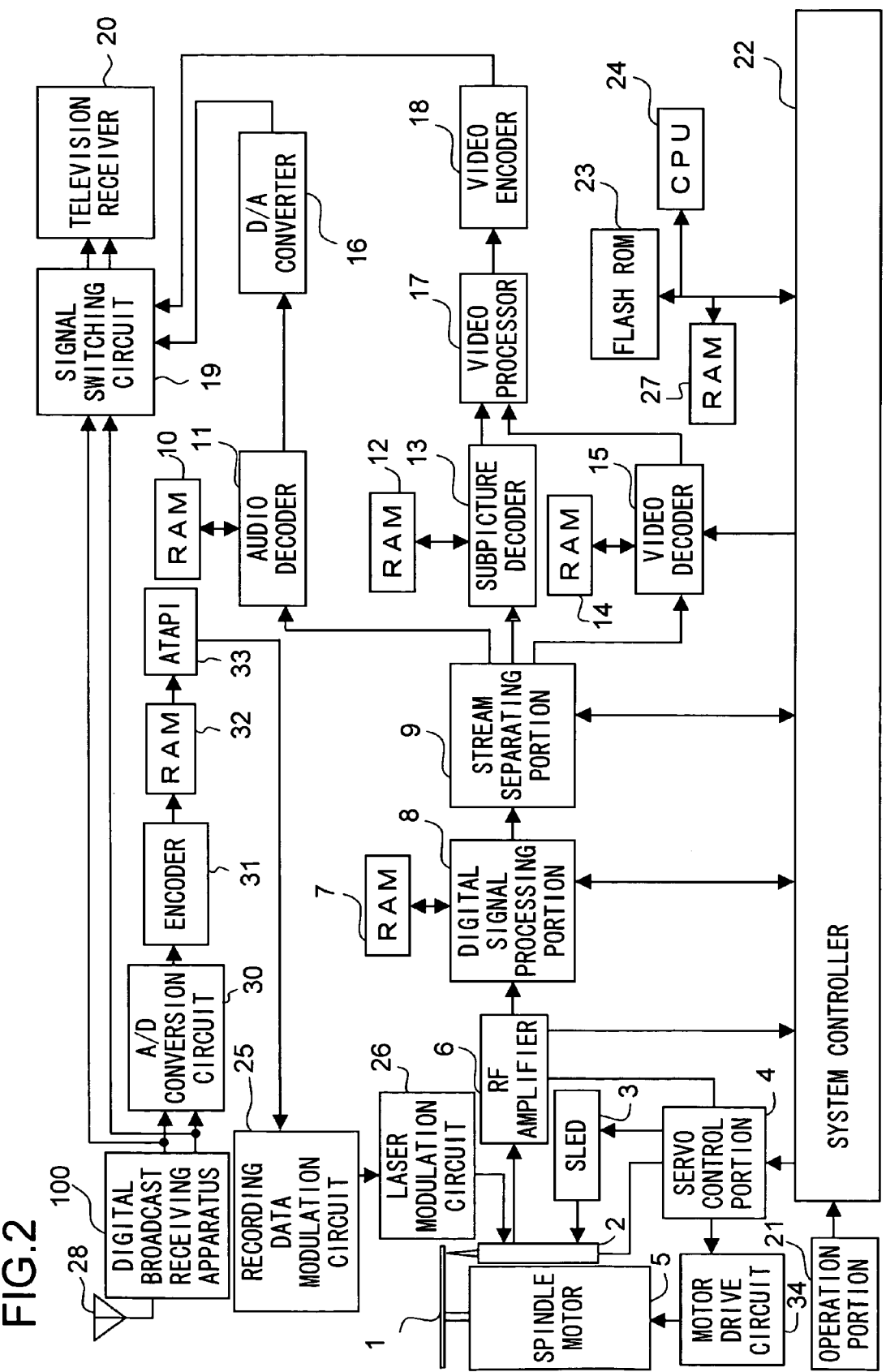
FIG. 2 is a block diagram showing the structure of the optical disc recording/playback apparatus (the DVD recorder) incorporating the digital broadcast receiving apparatus shown in FIG. 1.

FIG. 2 is a block diagram showing the structure of the optical disc recording/playback apparatus (the DVD recorder) incorporating the digital broadcast receiving apparatus 100 shown in FIG. 1.

This optical disc recording/playback apparatus has a system controller 22, a spindle motor 5, a motor drive circuit 34, an optical pickup 2, a sled 3, and a servo control portion 4. The system controller 22 controls the entire apparatus. The spindle motor 5 rotates an optical disc (a DVD, for example) 1. The motor drive circuit 34 drives the spindle motor 5. The optical pickup 2 optically writes and reads information to and from the optical disc 1. The sled 3 moves the optical pickup 2 in a radial direction of the optical disc 1. The servo control portion 4 drives the spindle motor 5, via the motor drive circuit 34, and the sled 3 according to instructions from the system controller 22, and moves a focus position of laser light in vertical and horizontal directions relative to a recording plane of the optical disc 1 by moving an objective lens (not shown) built in the optical pickup 2.

The optical disc recording/playback apparatus also has an RF amplifier 6, a digital signal processing portion 8, and a stream separating portion 9. When the optical disc 1 is played back, the RF amplifier 6 amplifies an RF signal, which is a read signal from the optical pickup 2. The digital signal processing portion 8 converts the RF signal outputted from the RF amplifier 6 into digital data, then performs signal demodulation and error correction according to the data format of the optical disc 1, and then stores the resultant data in a RAM 7 serving as a buffer memory. The stream separating portion 9 separates audio data, subpicture data, and video data from the data stream outputted from the digital signal processing portion 8 according to instructions from the system controller 22.

Furthermore, the optical disc recording/playback apparatus has an audio decoder 11, a RAM 10, a subpicture decoder 13, a RAM 12, a video decoder 15, and a RAM 14. The audio decoder 11 receives audio data outputted from the stream separating portion 9 and then performs predetermined decoding. The RAM 10 temporarily stores data for performing decoding in the audio decoder 11. The subpicture decoder 13 receives subpicture data outputted from the stream separating portion 9 and then performs predetermined decoding. The RAM 12 temporarily stores data for performing decoding in the subpicture decoder 13. The video decoder 15 receives video data outputted from the stream separating portion 9 and then performs decoding according to the MPEG standard. The RAM 14 temporarily stores data for performing decoding in the video decoder 15.

The optical disc recording/playback apparatus also has a video processor 17, a video encoder 18, and a D/A converter 16. According to instructions from the system controller 22, the video processor 17 combines data outputted from the video decoder 15 with data outputted from the subpicture decoder 13. The video encoder 18 converts the combined data outputted from the video processor 17 into a video signal for display, and then feeds the video signal to, for example, a video circuit of a television receiver 20. The D/A converter 16 converts data outputted from the audio decoder 11 into an analog audio signal, and then feeds the audio signal to, for example, an audio circuit of the television receiver 20.

A signal switching circuit 19 switches between the following two states: a state in which, in video mode, a video signal and an audio signal from the digital broadcast receiving apparatus 100 are directly fed to the television receiver 20; and a state in which, in playback mode after video mode, a video signal and an audio signal reproduced from the optical disc 1 are fed to the television receiver 20. The signal switching circuit 19 is controlled by the system controller 22 in response to an operation signal of an operation portion 21.

The optical disc recording/playback apparatus also has an operation portion 21, such as a remote control provided with various operation keys including a record key for giving a record instruction to the system controller 22, a playback key for giving a playback instruction thereto, and a stop key for giving a record/playback stop instruction thereto. Furthermore, the optical disc recording/playback apparatus has a flash ROM 23, a CPU 24, and a RAM 27. The flash ROM 23 stores a program or data for controlling individual components of the apparatus or the entire apparatus. The CPU 24 performs arithmetic operations according to the program or data stored in the flash ROM 23 and controls the system controller 22. The RAM 27 temporarily stores data required for arithmetic operations performed by the CPU 24.

The optical disc recording/playback apparatus also has the digital broadcast receiving apparatus (the BS tuner) 100, an A/D conversion circuit 30, an encoder 31, a RAM 32, an ATAPI (AT Attachment Packet Interface) 33, a recording data modulation circuit 25, and a laser modulation circuit 26. The digital broadcast receiving apparatus 100 is connected to an antenna 28. The A/D conversion circuit 30 converts a video/audio signal of a television broadcast selected by the digital broadcast receiving apparatus 100 or a video/audio signal outputted from another video/audio output apparatus into digital video/audio data. The encoder 31 encodes the video/audio data according to the MPEG standard. The RAM 32 serves as a buffer memory that temporarily stores a predetermined amount of encoded video/audio data (encoded data). The ATAPI serves as an interface between the RAM 32 and the record data modulation circuit 25. The recording data modulation circuit 25 modulates the encoded data transmitted from the ATAPI 33 for recording it on the optical disc 1. Based on the modulated data modulated by the recording data modulation circuit 25, the laser modulation circuit 26 outputs, to the optical pickup 2, a laser modulation signal for modulating laser light emitted from the optical pickup 2.

If the system controller 22 shown in FIG. 2 is provided with a function of the system control portion 123 shown in FIG. 1, there is no need for the digital broadcast receiving apparatus 100 to incorporate the system control portion 123. Likewise, if the operation portion 21 shown in FIG. 2 can be used as a substitute for the operation portion 124 shown in FIG. 1, it eliminates the need for the operation portion 124.

Figure 3:
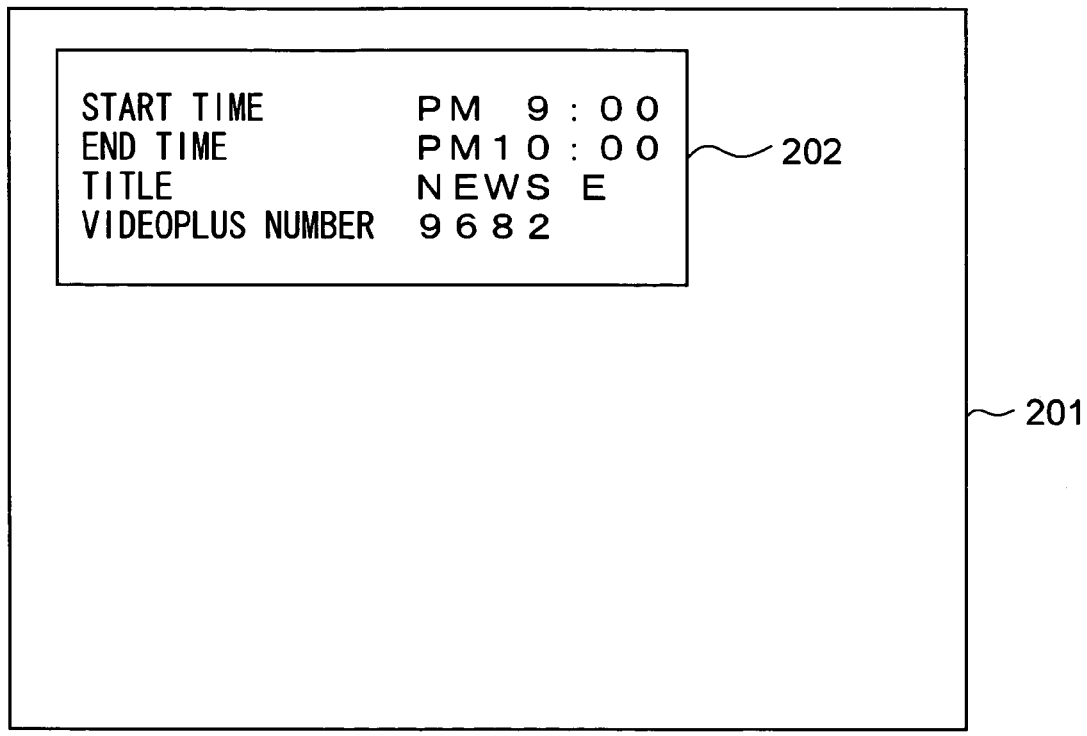
FIG. 3 is an illustration for explaining a program information screen displayed on the display screen of the television receiver.

FIG. 3 is an illustration for explaining a program information screen displayed on the display screen of, for example, the television receiver in this embodiment. In FIG. 3, reference numeral 201 represents a display screen, and reference numeral 202 represents a program information screen displayed on the display screen 201. The program information screen 202 shows information about a current program or a next program of the same channel. In this example, the information displayed includes start time (9:00 p.m.), end time (10:00 p.m.), title (news E), and VideoPlus number (9682). Here, it is assumed that the size of the program information screen 202 is equal to or smaller than, for example, a quarter of that of the display screen 201, and the program information screen 202 can be set at any position within the display screen 201.

Figure 4:
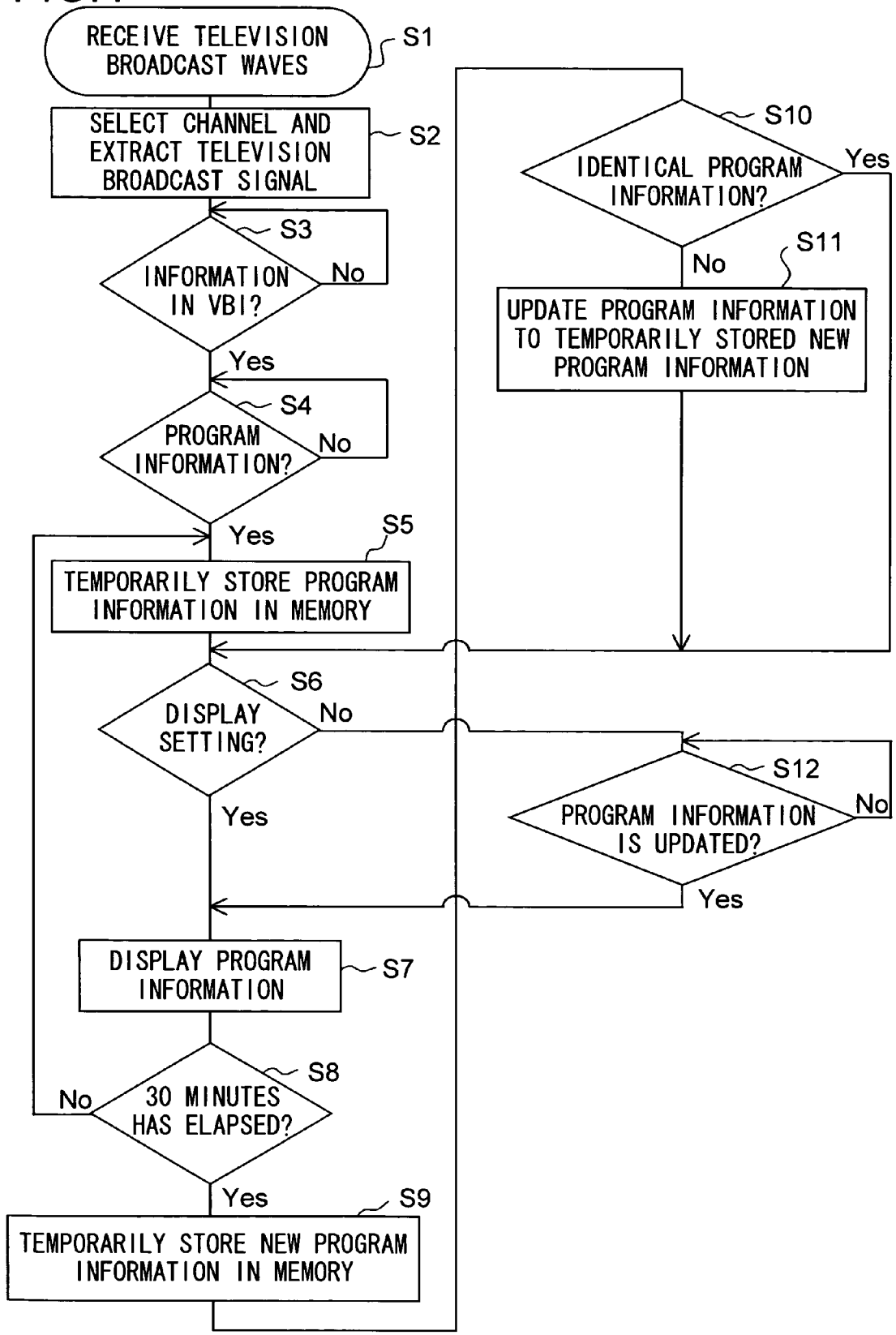
FIG. 4 is a flow chart showing the procedure for displaying a program information screen in the digital broadcast receiving apparatus.

FIG. 4 is a flow chart showing the procedure for displaying a program information screen in the digital broadcast receiving apparatus of this embodiment. Hereinafter, the procedure for displaying a program information screen in the digital broadcast receiving apparatus will be described with reference to this flow chart.

First, a broadcast station prepares information about a program to be broadcast. The data on the program includes start time, end time, title, and VideoPlus number. The broadcast station then compresses the data, then inserts the compressed data in the VBI of a television broadcast signal, and then transmits the television broadcast signal thus obtained.

In the digital broadcast receiving apparatus 100 shown in FIG. 1, the television broadcast signal including the compressed data is received by the tuner portion 112. The compressed data is then stored in the memory 116, is then expanded, and is then stored in the memory 116 as program information. When the program information is requested by the user, or when setting is set so that program information is automatically displayed at the time of program change, the digital broadcast receiving apparatus 100 displays the program information on the display screen. Hereinafter, this procedure will be described according to the flow chart.

In FIG. 1, the digital broadcast receiving apparatus 100 receives television broadcast waves via the antenna 111 (step S1), and, in response to a channel selection signal from the operation portion 124 key-operated by the user, the system control portion 123 makes the tuner portion 112 to select a requested channel and then extract a television broadcast signal of the channel (step S2).

Next, the program information checking portion checks whether information is found in the VBI of the television broadcast signal or not (step S3) and whether the information is program information or not (step S4). If the program information is found, the system control portion 123 makes the first program information storage portion temporarily store the program information in the memory 116 (step S5).

Here, if program information display setting is enabled by operation by the user (step S6), the system control portion 123 makes the program information screen display portion read the program information from the memory 116 and display the program information screen (see FIG. 3) showing the program information including start time, end time, title, and VideoPlus number in a predetermined area of the display screen (step S7).

When a predetermined time has elapsed, for example, when 30 minutes have elapsed (step S8), the system control portion 123 makes the second program information storage portion temporarily store, in the memory 116, new program information obtained after a lapse of 30 minutes (step S9). The system control portion 123 then makes the program information comparison portion compare the program information stored in the memory 116 by the first program information storage portion with the new program information stored in the memory 116 by the second program information storage portion so as to check whether or not the former is identical to the latter (step S10).

If the comparison reveals a difference, the system control portion 123 makes the program information update portion update program information to be displayed to the new program information stored in the memory 116 (step S11). If program information display settling is enabled by operation by the user (step S6), the program information screen showing the updated program information is displayed (step S7). If program information display setting is disabled, when an update of the program information is detected (step S12), the system control portion 123 makes the program information update/display portion update the current program information to the new program information and display the program information screen showing the new program information on the display screen (step S7).

As described above, according to this embodiment, it becomes possible to view information about a program of a current channel and a next program to be broadcast in real time, and deal with a change in program, if any. That is, since the amount of information is small compared to conventional electronic program guides and hence the program information screen can be updated in real time, it is possible to obtain up-to-the-minute program information on a constant basis. Furthermore, since the amount of information is small, the information screen is prevented from occupying large amount of screen space even when the information screen is automatically displayed at the time of program change. This permits the enjoyment of viewing video unobstructed by the information screen.

This embodiment deals with an example in which a digital broadcast receiving apparatus (a BS tuner) is incorporated in an optical disc recording/playback apparatus (a DVD recorder); however, it is also possible to incorporate the digital broadcast receiving apparatus in an HDD recorder or a video cartridge recorder (VCR). Instead, the digital broadcast receiving apparatus (the BS tuner) may be incorporated in a television receiver. Alternatively, the digital broadcast receiving apparatus (the BS tuner) may be incorporated in a composite apparatus consisting of the optical disc recording/playback apparatus (the DVD recorder) and the HDD recorder, a composite apparatus consisting of the optical disc recording/playback apparatus (the DVD recorder) and the video cartridge recorder, a composite apparatus consisting of the HDD recorder and the video cartridge recorder, or a composite apparatus consisting of the optical disc recording/playback apparatus (the DVD recorder), the video cartridge recorder, and the HDD recorder.

What is claimed is:

1. A digital broadcast receiving apparatus that receives a television broadcast signal multiplexed with video data, audio data, and program information and then transmitted thereto, selects a desired channel, outputs a video signal and an audio signal of the channel, and has a function of displaying an electronic program guide based on the program information, the digital broadcast receiving apparatus comprising:
   a system control portion that
      when program information is found in a VBI of the television broadcast signal and program information display setting pre-set by a user and stored in a memory is enabled, displays a program information screen showing program information including start time, end time, title, and VideoPlus number in a predetermined area of a display screen based on the program information,
      if a change in the program information is found when a predetermined time has elapsed, updates the program information displayed on the program information screen to new program information, and
      if an update of the program information is detected when program information display setting pre-set by the user and stored in the memory is disabled, displays a program information screen showing updated program information on the display screen.

2. The digital broadcast receiving apparatus of claim 1, wherein the system control portion includes
   a program information checking portion that checks whether program information is found in a VBI of the television broadcast signal or not,
   a program information screen display portion that, when the program information is found in the VBI of the television broadcast signal and program information display setting is enabled, displays a program information screen showing program information including start time, end time, title, and VideoPlus number in a predetermined area of the display screen based on the program information,
   a program information comparison portion that, when a predetermined time has elapsed, compares new program information with the current program information, and
   a program information update portion that, when the comparison reveals a difference, updates program information to be displayed to the new program information.

3. The digital broadcast receiving apparatus of claim 1, wherein the system control portion includes
   a program information checking portion that checks whether program information is found in a VBI of the television broadcast signal or not,
   a program information comparison portion that, when program information is found in the VBI of the television broadcast signal, compares new program information obtained when a predetermined time has elapsed with the current program information, a program information update portion that, when the comparison reveals a difference, program information to be displayed to the new program information, and a program information update/display portion that, if the comparison reveals a difference when program information display setting is disabled, updates the program information displayed on the program information screen to the new program information.

4. The digital broadcast receiving apparatus of claim 1, wherein the system control portion includes a program information checking portion that checks whether program information is found in a VBI of the television broadcast signal or not, a first program information storage portion that, when the program information is found in the VBI of the television broadcast signal, temporarily stores the program information in a memory, a program information screen display portion that, when program information display setting is enabled, reads the program information from the memory and displays a program information screen showing program information including start time, end time, title, and VideoPlus number in a predetermined area of the display screen, a second program information storage portion that, when a predetermined time has elapsed, new program information in the memory, a program information comparison portion that compares the program information stored in the memory by the first program information storage portion with the new program information stored in the memory by the second program information storage portion, a program information update portion that, when the comparison reveals a difference, updates program information to be displayed to the new program information, and a program information update/display portion that, if the comparison reveals a difference when program information display setting is disabled, updates the current program information to the new program information and displays a program information screen on the display screen.

5. A digital broadcast receiving apparatus that receives a television broadcast signal multiplexed with video data, audio data, and program information and then transmitted thereto, selects a desired channel, outputs a video signal and an audio signal of the channel, and has a function of displaying an electronic program guide based on the program information, the digital broadcast receiving apparatus comprising:

a system control portion including a program information checking portion that checks whether program information is found in a VBI of the television broadcast signal or not, a first program information storage portion that, when the program information is found in the VBI of the television broadcast signal, temporarily stores the program information in a memory, a program information screen display portion that, when program information display setting pre-set by a user and stored in a memory is enabled, reads the program information from the memory and displays a program information screen showing program information including start time, end time, title, and VideoPlus number in a predetermined area of a display screen, a second program information storage portion that, when a predetermined time has elapsed, new program information in the memory, a program information comparison portion that compares the program information stored in the memory by the first program information storage portion with the new program information stored in the memory by the second program information storage portion, a program information update portion that, when the comparison reveals a difference, updates program information to be displayed to the new program information, and a program information update/display portion that, if the comparison reveals a difference when program information display setting pre-set by the user and stored in the memory is disabled, updates the current program information to the new program information and displays a program information screen on the display screen.

* * * * *